United States Patent [19]

Matsubara

[11] Patent Number: 5,283,098
[45] Date of Patent: Feb. 1, 1994

[54] MEMBER FOR LIGHT SHIELDING BLADES

[75] Inventor: Takashi Matsubara, Tokyo, Japan

[73] Assignee: Nikon Corporation, Tokyo, Japan

[21] Appl. No.: 760,122

[22] Filed: Sep. 16, 1991

[30] Foreign Application Priority Data

Sep. 25, 1990 [JP] Japan ............................ 2-254580
Apr. 18, 1991 [JP] Japan ............................ 3-086448

[51] Int. Cl.$^5$ .................................................. B32B 5/12
[52] U.S. Cl. .................................. 428/113; 428/408; 428/220; 428/114; 428/902; 428/302
[58] Field of Search ......................... 428/113, 114, 408

[56] References Cited

U.S. PATENT DOCUMENTS

| 4,549,933 | 10/1985 | Judd et al. | 162/281 |
| 4,820,567 | 4/1989 | Scola et al. | 428/105 |
| 4,965,617 | 10/1990 | Matsubara | 354/246 |

FOREIGN PATENT DOCUMENTS

| 0431931 | 6/1991 | European Pat. Off. . |
| 0447211 | 9/1991 | European Pat. Off. . |

*Primary Examiner*—George F. Lesmes
*Assistant Examiner*—Chris Raimund
*Attorney, Agent, or Firm*—Shapiro and Shapiro

[57] ABSTRACT

A lightweight and strong plate member for light-shielding blades usable for the super-high speed shutter of a camera or the like is of a symmetrical structure with respect to a center plane in the thickness direction, and comprises reinforced surface layers having continuous carbon fibers arranged in one direction parallel or substantially parallel to the longitudinal direction of the light shielding blade, and matrix resin including this fiber, and a reinforced intermediate layer having the continuous carbon fibers arranged in one direction, and matrix resin including this fiber. The fiber directions of the intermediate layer is substantially orthogonal to that of the surface layers, and the carbon fiber of the surface layers has a tensile modulus of elasticity of 30,000 Kgf/mm$^2$ or more, tensile strength of 350 Kgf/mm$^2$ or more, and elongation of 1.0% or more, and the carbon fiber of the intermediate layer has an elongation of 1.0% or more.

24 Claims, 1 Drawing Sheet

MEMBER FOR LIGHT SHIELDING BLADES

BACKGROUND OF THE INVENTION

1. Field of the Invention

The present invention relates to a plate used in light-shielding blades for which a high-speed motion is required, such as shutter blades for a focal-plane shutter, lens shutter or diaphragm blades.

2. Related Background Art

In recent years, with the improvement of film sensitivity and greater demand on image representations, higher shutter speeds have been required for cameras.

In order to increase the shutter speed, it may be possible to increase the driving force of the driving system. Then, a problem is encountered in that the capacity of a battery currently in use is not sufficient or in that its replacement is required sooner.

Therefore, it is necessary to lighten the blades per se. To lighten the blades, it would readily occur to make the blades thinner. However, making the blades thinner means substantially reducing rigidity, and there arises a so-called waving phenomenon, i.e., the blades are caused to wave in motion or at rest. The wave progress in the longitudinal direction.

If a shutter is driven when this waving phenomenon has been generated or is being generated, one blade may collide against another blade, a second group of blades or the housing frame which determines an image angle, leading to breakage.

Therefore, the plate member for the light shielding blades should be light yet highly rigid.

As a light-shielding blade member, there have been developed plate members such as disclosed in Japanese Patent Laid-Open Application No. 59-61827, Japanese Utility Model Laid-Open Application No. 60-63825, Japanese Patent Laid-Open Application No. 62-199439, and Japanese Patent Laid-Open Application No. 63-17435, which is structured with stacked layers formed with reinforced resin surface layers, each consisting of continuous carbon fibers oriented in one direction and matrix resin including this fiber, and a reinforced resin intermediate layer sandwiched by the two surface layers and consisting of continuous carbon fibers also oriented in one direction and a matrix resin including this fiber.

In these plate members, the longitudinal direction (orientation) of the carbon fiber of the surface layers and the longitudinal direction of the carbon fiber of the intermediate layer are orthogonal or almost orthogonal to each other in order to obtain isotropy.

The thickness of the plate member is approximately 60–120 μm.

The plate members are stacked in symmetry with respect to a center plane in the thickness direction as a matter of course. Also, both the surface layers and intermediate layer are not necessarily limited to a single layer, but may be a layer produced by stacking a plurality of thin reinforced sheets.

By punching or cutting this plate member into a predetermined shape of the light shielding blades, it is possible to obtain approximately 20–50 light and highly strong and rigid light-shielding blades per plate member.

This type of light-shielding blade is practically used for a camera having a shutter speed of 1/8,000 second.

SUMMARY OF THE INVENTION

Recently, a need has developed for a super-high speed shutter having a speed exceeding (faster than) 1/8,000 second.

In meeting such requirement, a first problem has arisen in that prior solutions to the waving phenomenon are not effective when a shutter is driven at such a super-high speed. Also, a second problem has arisen in that the conventional coupling between the driving system and arms for the blades by caulking does not provide sufficient strength of the coupling portion to withstand the super-high speed required for the shutter.

An object of the present invention is to solve these problems simultaneously.

The inventor hereof has discovered after careful studies of the aforementioned problems that while it is necessary to provide the rigidity to restrict the curvature in the longitudinal direction of the blade for the control of the waving phenomenon, the rigidity to restrict the curvature in the direction perpendicular to the longitudinal direction of the blade can be made approximately 1/10 of the former, and that it is unnecessary to use a highly rigid carbon fiber for the intermediate layer which does not contribute to the rigidity to restrict curvature in the longitudinal direction.

Rather, according to the studies of the inventor hereof, it has been found necessary to use a material having a large elongation (particularly in the direction substantially perpendicular to the longitudinal direction of the blade) for the intermediate layer in order to solve the earlier noted second problem.

As a result of the further studies, it has been found more particularly that the first problem can be solved by using a carbon fiber having a tensile modulus of elasticity of 30,000 Kgf/mm$^2$ or more (preferably 35,000 Kgf/mm$^2$ or more) for the surface layers, and that the second problem can be solved by using a carbon fiber having a tensile strength of 350 Kgf/mm$^2$ or more (preferably, say, 400 Kgf/mm$^2$) and an elongation of 1.0% or more for the surface layers and a carbon fiber having an elongation of 1.0% or more (preferably 1.2% or more) for the intermediate layer.

Therefore, the present invention provides, for example, a plate member for light-shielding blades having a layer structure which is symmetrical with respect to a central plane in the thickness direction and formed by reinforced resin surface layers with continuous carbon fibers uniformly arranged parallel or substantially parallel to the longitudinal direction of the light-shielding blade and a matrix resin including this fiber, and a reinforced resin intermediate layer with continuous or staple carbon fibers uniformly arranged in one direction and matrix resin including this fiber, wherein the longitudinal direction of the carbon fibers of the aforesaid intermediate layer and that of the aforesaid surface layers are orthogonal or almost orthogonal to each other, and wherein the carbon fiber of the aforesaid surface layers has a tensile modulus of elasticity of 30,000 Kgf/mm$^2$ or more, a tensile strength of 350 Kgf/mm$^2$ or more and an elongation of 1.0% or more, and the carbon fiber of the aforesaid intermediate layer has an elongation of 1.0% or more.

In the present invention, although the tensile modulus of elasticity is defined to be 30,000 Kgf/mm$^2$ or more, there is no particular upper limit to this value. At present, however, it is difficult to obtain the carbon fiber having a tensile modulus of elasticity exceeding 60,000 Kgf/mm².

Also, the elongation of the carbon fiber for the intermediate layer is defined to be 1.0% or more, but there is no particular upper limit to this value. At present, however, it is difficult to obtain carbon fiber having a an elongation exceeding 2.5%.

Also, in the present invention, if using a carbon fiber having a tensile modulus of elasticity of 30,000 Kgf/mm² or more, tensile strength of 350 Kgf/mm² or more, and elongation of 1.0% or more, the same carbon fiber could be used both for the surface layers and intermediate layer.

The reinforced resin of the intermediate layer and surface layers is formed with continuous carbon fibers arranged in one direction (for the intermediate layer, staple fiber usable) and matrix resin including this fiber. As such a material, it is desirable to use a prepreg sheet produced by impregnating carbon fiber into a precursor of the matrix resin.

The prepreg sheet is produced in such a way that subsequent to a thermosetting liquid resin (for example, liquid substance yet to be hardened such as epoxy resin or unsaturated polyester) which is a precursor of the matrix resin having been impregnated with the fiber, the aforesaid liquid resin is kept in a state of B stage (i.e., a state where the liquid resin is temporarily solidified to the extent that it does not have any obvious fluidity and is brought into a final stage of hardness if heated).

In order to obtain the plate member to be used for the present invention, at least one prepreg sheet of approximately 10–60 μm thick for the intermediate layer and at least two for the surface layers sandwiching the intermediate layer are stacked in such a way that the longitudinal directions of unidirectional carbon fibers of the intermediate layer and the surface layers are orthogonal or almost orthogonal to each other and symmetrical with respect to a central plane in the thickness direction of the plate member. Then, the liquid resin is hardened by heat pressing.

Instead of one prepreg sheet each for the intermediate layer and surface layers, plural sheets (for example, 2–5 sheets) may be stacked for the purpose. In this case, the fiber directions may be either orthogonal or parallel (all in the same direction) for the intermediate layer or for the respective surface layers. For example, one prepreg sheet is used for each of the surface layers while two sheets are used for the intermediate layer with the fiber directions these two sheets being parallel to each other and orthogonal to that of the surface layers.

In this respect, carbon fiber of approximately 3–10 μm diameter is appropriate.

Also, if the light-shielding capability and surface smoothness are not sufficient, it may be possible to add carbon black of approximately 5–10 weight percent to the liquid resin (100 weight portion of solid) in advance when the prepreg sheet is prepared. In this case, the average grain size of the carbon black should desirably be 0.07 μm or less. The carbon black may be added only to the surface layers or only to the intermediate layer. Either of them has its own characteristics.

The plate member can be obtained by thermally pressing the stacked prepreg sheets, and the appropriate thickness of the aforesaid plate member is 40–120 μm in terms of the plate thickness; particularly 40–100 μm is most preferred.

It may be possible to coat the plate member in black (dry lubrication coating) at this stage. This coating is given for the purpose of improving the light-shielding capability, reduction of the surface reflection factor, improvement of the outer appearance, and surface lubrication. The appropriate thickness of the coated film is 0.1–10 μm, but if the thickness of the coated film is kept as thin as approximately 0.1–0.3 μm, there is less possibility of plate warpage.

The plate member thus obtained is punched or cut into a predetermined shape of the light-shielding blade (punched or cut in such a way that the longitudinal direction of the carbon fiber of the intermediate layer is orthogonal or almost orthogonal to the longitudinal direction of the light-shielding blade). Hence, approximately 20–50 light-shielding blades can be obtained. It may be possible to give the aforesaid black coating to these blades.

DETAILED DESCRIPTION OF THE PREFERRED EMBODIMENTS

Figure 1:
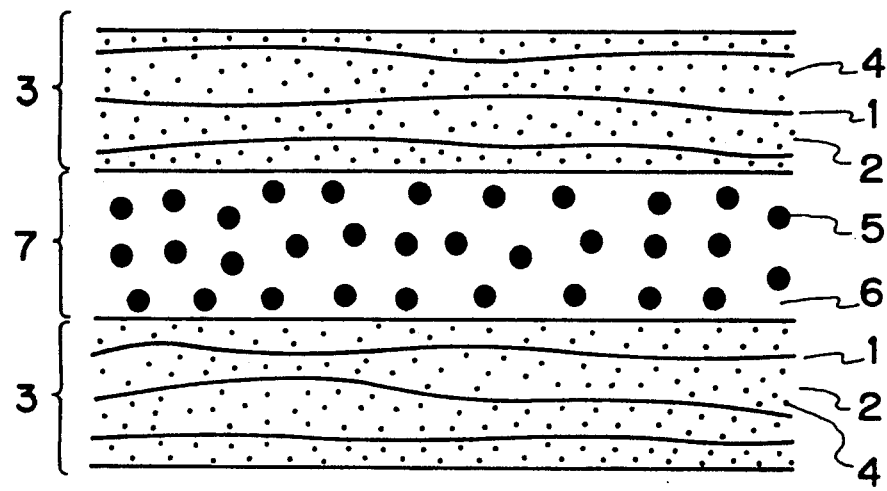
FIG. 1 is a vertical cross-sectional view schematically showing a plate member for the light-shielding blade according to the later described embodiment 2 of the present invention.

The invention will now be described with reference to several preferred embodiments, but it is to be understood that the present invention is not limited to these embodiments, which are merely exemplary.

EMBODIMENT 1

(1) At first, there are prepared two prepreg sheets A 20–40 μm thick having continuous carbon fibers arranged in one direction, the fibers having a tensile modulus of elasticity of 35,000 Kgf/mm², tensile strength of 350–400 Kgf/mm², and elongation of 1.0–1.2%. The sheets further include epoxy resin having an average grain size of 4–7 μm and the resin content of the sheets is 35–55 weight percent (preferably 35–45 weight percent).

(2) Next, there is prepared one prepreg sheet B 20–40 μm thick having continuous carbon fibers arranged in one direction, the fibers having an elongation of 1.5–1.8%, and epoxy resin having an average grain size of 4–7 μm. The sheet has a resin content of 35–55 weight percent (preferably 40–50 weight percent).

(3) The above-mentioned two sheets A and one sheet B are prepared, and the three sheets are stacked symmetrically with respect to a central plane in the thickness direction so that the longitudinal directions of the carbon fibers are arranged as follows:

0° (surface layer)/90° (intermediate layer)/0° (surface layer)

and the kinds of the sheets are arranged as follows:

A (surface layer)/B (intermediate layer)/A (surface layer).

Then, the stacked layers are pressurized under a pressure of 5–15 kgf/cm² at a temperature of 130° C., and left in such state for 1–2 hours to harden the epoxy resin. After that, they are gradually cooled to room temperature. Hence, the plate member having a plate thickness of 40–90 μm is obtained.

(4) Subsequently, 20–50 light-shielding blades for the focal plane shutter are produced from the one plate member by the punching press machining. Here, the punching is performed so that the direction of the carbon fiber of the intermediate layer is substantially orthogonal to the longitidinal direction of the light-shielding blade.

(5) For a number of the shielding blades thus obtained, the dry lubrication coating is given on both sides in a film thickness of 4 μm each.

COMPARATIVE EXAMPLE 1

In place of the prepreg sheets A used for the embodiment 1, prepreg sheets $A_2$ the same as the prepreg sheets A are used with the exception of the tensile modulus of elasticity of the carbon fiber which is now 23,500 Kgf/mm$^2$, and the plate member, light-shielding blades, and coated light-shielding blades are produced sequentially as in the case of the embodiment 1.

COMPARATIVE EXAMPLE 2

In place of the prepreg sheet B used for the embodiment 1, a prepreg sheet $B_2$ the same as the prepreg sheet B is used with the exception of the elongation of the carbon fiber which is now 0.8%, and the plate member, light-shielding blades, and coated light-shielding blades are produced sequentially as in the case of the embodiment 1.

TEST EXAMPLE

Test shutters are prepared for the respective light-shielding blades of the embodiment 1 and the comparative examples 1 and 2. Then, the durability of each shutter is examined by setting the time for one blade to move vertically for an image angle of 24 mm (reversely proportional to traveling velocity) at 2.8 msec for the first test, and 2.5 msec for the second test. The results of the tests are shown in Table 1.

| Plate member | Result of 1st Test | Result of 2nd Test |
| --- | --- | --- |
| Embodiment 1 | More than 100,000 times. No abnormality observed. | More than 100,000 times. No abnormality observed. |
| Comparative Example 1 | At about 20,000 times. Abnormality observed. | At about 10,000 times. Abnormality observed. |
| Comparative Example 2 | At several-thousand times. Abnormality observed. | At several-thousand times. Abnormality observed. |

As the above table shows, the embodiment 1 shows a far better durability than the comparative examples 1 and 2.

EMBODIMENT 2

Prepreg sheets A' are prepared, which are the same as the prepreg sheets A used for the embodiment 1, but carbon black with an average grain size of 0.01 μm or less is added in an amount of 10 weight percent per 100 weight portion of resin.

Then, in the same sequence as in the embodiment 1, the plate member, light-shielding blades, and coated light-shielding blades are produced using the prepreg sheets A' instead of the prepreg sheets A.

FIG. 1 is a vertical cross-section of a plate member of a light-shielding blade according to the second embodiment of the invention. The light-shielding plate is composed of surface layers 3 and an intermediate layer 7.

Each surface layer 3 is formed by continuous carbon fibers 1, matrix resin 2 and carbon black 4. The intermediate layer 7 is formed by continuous carbon fibers 5 and matrix resin 6. In the Figure, a coated layer is not shown, and the large and small dots have been used respectively to show the carbon fibers 5 and carbon black 4 with greater distinction.

EMBODIMENT 3

A prepreg sheet B' is prepared, which is the same as the prepreg sheet B used for the embodiment 1, but carbon black with its average size of grains being 0.01 μm or less is added in an amount of 10 weight percent per 100 weight portion of resin.

Then, in the same sequence as in the embodiment 1, the plate member, light-shielding blades, and coated light-shielding blades are produced using the prepreg sheet B' instead of the prepreg sheet B as in the case of the embodiment 1.

Figure 2:
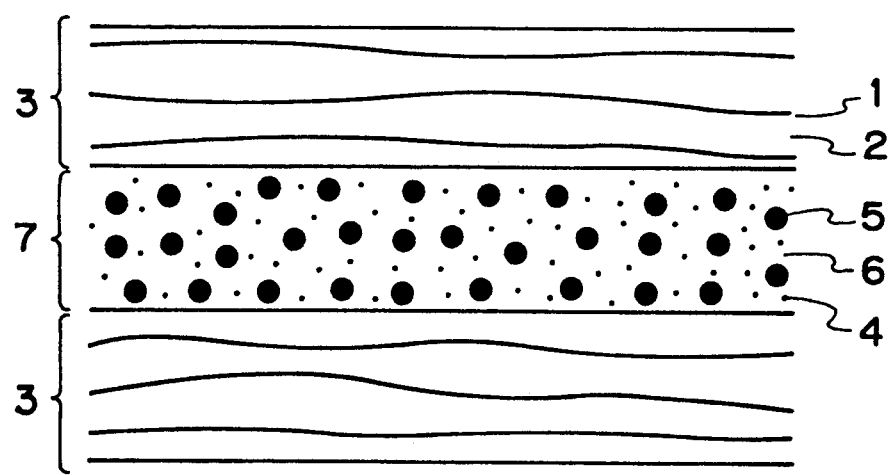
FIG. 2 is a vertical cross-sectional view schematically showing a plate member for the light-shielding blade according to the later described embodiment 3 of the present invention.

In FIG. 2, the light-shielding material is composed of surface layers 3 and an intermediate layer 7. Each surface layer is formed by continuous carbon fibers 1 and matrix resin 2. The intermediate layer 7 is formed by continuous carbon fibers 5, matrix resin 6 and carbon black 4. In FIG. 2, a coated layer is not shown.

For the coated light-shielding blades of embodiments 2 and 3, the high-speed shutter durability tests are conducted with the results that both of them demonstrate durable performances of more than 100,000 times and that these are proven to have a sufficient high-speed stability and high-speed traveling capability.

According to the present invention as set forth above, it is possible to obtain a plate member for light-shielding blades demonstrating a sufficient durability even at a super-high speed traveling of the light-shielding blades such as a shutter speed exceeding (faster than) 1/8,000 second, because there is no occurrence of the waving phenomenon and there is sufficient strength of the coupling portion between the blade and arm. In other words, with the present invention it is possible to implement a super-high speed shutter traveling at a velocity which exceeds 1/8,000 second.

The effect of the present invention is particularly significant in that a plate member having a thin plate thickness can be obtained, while still providing the characteristics required of a super-high speed shutter.

Also, with the present invention, the functions of the surface layer and the intermediate layer are made distinct, and the isotropy of the layers is not necessarily taken as the first consideration. Thus, it becomes unnecessary to use carbon fiber having an exceedingly high rigidity, high strength, and high elongation. Also, for the intermediate layer, it is possible to use an inexpensive carbon fiber which has a high elongation but low tensile modulus of elasticity, thus leading to a reduction of the manufacturing cost of the plate member.

I claim:

1. A plate member of a light-shielding blade, having:
   reinforced resin surface layers comprising continuous carbon fibers arranged in one direction substantially parallel to the longitudinal direction of the light-shielding blade, and a matrix resin including this fiber, and
   a reinforced resin intermediate layer comprising continous carbon fibers arranged in one direction, and a matrix resin including this fiber, the direction of the carbon fibers of said intermediate layer and that of said surface layers being substantially orthogonal to each other, and the carbon fiber of said surface layers having a tensile modulus of elasticity of 30,000 Kgf/mm$^2$ or more, tensile strength of 350 Kgf/mm$^2$ or more, and an elongation of 1.0% or more, and the carbon fiber of said intermediate layer having an elongation of greater than that of the carbon fiber of said surface layers.

2. A plate member for according to claim 1, wherein the plate thickness of said member is 40–100 μm.

3. A plate member of a light-shielding blade, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers arranged in a first direction substantially parallel to the longitudinal direction of the light-shielding blade, and a matrix resin including this fiber, said intermediate layer means including at least one layer having continuous carbon fibers arranged in a second direction substantially orthogonal to said first direction, the carbon fiber of said one layer of each of said outer layer means having a tensile modulus of elasticity of 30,000 Kgf/mm$^2$ or more, tensile strength of 350 Kgf/mm$^2$ or more, and an elongation of 1.0% or more, and the carbon fiber of said one layer of said intermediate layer means having an elongation greater than that of the carbon fiber of said one layer of each of said outer layer means.

4. A plate member according to claim 3, wherein the thickness of said plate member is 40–100 μm.

5. A light-shielding plate member, having:

reinforced resin surface layers comprising continuous carbon fibers arranged in a first direction and a matrix resin including this fiber, and a reinforced resin intermediate layer comprising continuous carbon fibers arranged in a second direction substantially orthogonal to said first direction, and a matrix resin including this fiber, the carbon fiber of said surface layers having a tensile modulus of elasticity of 30,000 Kgf/mm$^2$ or more, tensile strength of 350 Kgf/mm$^2$ or more, and an elongation of 1.0% or more, and the carbon fiber of said intermediate layer having an elongation greater than that of the carbon fiber of said surface layers.

6. A plate member according to claim 5, wherein the thickness of said plate member is 40–100 μm.

7. A light-shielding plate member, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers arranged in a first direction, and a matrix resin including this fiber, said intermediate layer means including at least one layer having continuous carbon fibers arranged in a second direction substantially orthogonal to said first direction, the carbon fiber of said one layer of each of said outer layer means having a tensile modulus of elasticity of 30,000 Kgf/mm$^2$ or more, tensile strength of 350 Kgf/mm$^2$ or more, and an elongation of 1.0% or more, and the carbon fiber of said one layer of said intermediate layer means having an elongation greater than that of the carbon fiber of said one layer of each of said outer layer means.

8. A plate member according to claim 7, wherein the thickness of said plate member is 40–100 μm.

9. A plate member of a light-shielding blade, having:

reinforced resin surface layers comprising continuous carbon fibers arranged in one direction substantially parallel to the longitudinal direction of the light-shielding blade, and a matrix resin including this fiber, and a reinforced resin intermediate layer comprising staple carbon fibers arranged in one direction, and a matrix resin including this fiber, the direction of the carbon fibers of said intermediate layer and that of said surface layers being substantially orthogonal to each other, and the carbon fiber of said surface layers having a tensile modulus of elasticity of 30,000 Kgf/mm$^2$ or more, tensile strength of 350 Kgf/mm$^2$ or more, and an elongation of 1.0% or more, and the carbon fiber of said intermediate layer having an elongation greater than that of the carbon fiber of said surface layers.

10. A plate member according to claim 9, wherein the thickness of said plate member is 40–100 μm.

11. A plate member of a light-shielding blade, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers arranged in a first direction substantially parallel to the longitudinal direction of the light-shielding blade, and a matrix resin including this fiber, said intermediate layer means including at least one layer having staple carbon fibers arranged in a second direction substantially orthogonal to said first direction, the carbon fiber of said one layer of each of said outer layer means having a tensile modulus of elasticity of 30,000 Kgf/mm$^2$ or more, tensile strength of 350 Kgf/mm$^2$ or more, and an elongation of 1.0% or more, and the carbon fiber of said one layer of said intermediate layer means having an elongation greater than that of the carbon fiber of said one layer of each of said outer layer means.

12. A plate member according to claim 11, wherein the thickness of said plate member is 40–100 μm.

13. A light-shielding plate member, having:

reinforced resin surface layers comprising continuous carbon fibers arranged in a first direction and a matrix resin including this fiber, and a reinforced resin intermediate layer comprising staple carbon fibers arranged in a second direction substantially orthogonal to said first direction, and a matrix resin including this fiber, the carbon fiber of said surface layers having a tensile modulus of elasticity of 30,000 Kgf/mm$^2$ or more, tensile strength of 350 Kgf/mm$^2$ or more, and an elongation of 1.0% or more, and the carbon fiber of said intermediate layer having an elongation greater than that of the carbon fiber of said surface layers.

14. A plate member according to claim 13, wherein the thickness of said plate member is 40–100 μm.

15. A light-shielding plate member, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers arranged in a first direction, and a matrix resin including this fiber, said intermediate layer means including at least one layer having staple carbon fibers arranged in a second direction substantially orthogonal to said first direction, the carbon fiber of said one layer of each of said outer layer means having a tensile modulus of elasticity of 30,000 Kgf/mm² or more, tensile strength of 350 Kgf/mm² or more, and an elongation of 1.0% or more, and the carbon fiber of said one layer of said intermediate layer means having an elongation greater than that of the carbon fiber of said one layer of each of said outer layer means.

16. A plate member according to claim 15, wherein the thickness of said plate member is 40–100 μm.

17. A plate member of a light-shielding blade, having:

reinforced resin surface layers comprising continuous carbon fibers arranged in one direction substantially parallel to the longitudinal direction of the light-shielding blade, and a matrix resin including this fiber, and a reinforced resin intermediate layer comprising continuous carbon fibers arranged in one direction, and a matrix resin including this fiber, the direction of the carbon fibers of said intermediate layer and that of said surface layers being substantially orthogonal to each other, and the carbon fiber of said surface layers having tensile strength of 350 Kgf/mm² or more, and the carbon fiber of said intermediate layer having an elongation greater than that of the carbon fiber of said surface layers.

18. A plate member of a light-shielding blade, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers with tensile strength of 350 Kgf/mm² or more arranged in a first direction of substantially parallel to the longitudinal direction of the light-shielding blade, and a matrix resin including this fiber, said intermediate layer means including at least one layer having continuous carbon fibers arranged in a second direction substantially orthogonal to said first direction, the carbon fiber of said one layer of said intermediate layer means having an elongation greater than that of the carbon fiber of said one layer of each of said outer layer means.

19. A light-shielding plate member, having:

reinforced resin surface layers comprising continuous carbon fibers arranged in a first direction and a matrix resin including this fiber, and a reinforced resin intermediate layer comprising continuous carbon fibers arranged in a second direction substantially orthogonal to said first direction, and a matrix resin including this fiber, the carbon fiber of said surface layers having tensile strength of 350 Kgf/mm² or more, and the carbon fiber of said intermediate layer having an elongation greater than that of the carbon fiber of said surface layers.

20. A light-shielding plate member, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers with tensile strength of 350 Kgf/mm² or more arranged in a first direction, and a matrix resin including this fiber, said intermediate layer means including at least one layer having continuous carbon fibers arranged in a second direction substantially orthogonal to said first direction, the carbon fiber of said one layer of said intermediate layer means having an elongation greater than that of the carbon fiber of said one layer of each of said outer layer means.

21. A plate member of a light-shielding blade, having:

reinforced resin surface layers comprising continuous carbon fibers arranged in one direction substantially parallel to the longitudinal direction of the light-shielding blade, and a matrix resin including this fiber, and a reinforced resin intermediate layer comprising staple carbon fibers arranged in one direction, and a matrix resin including this fiber, the direction of the carbon fibers of said intermediate layer and that of said surface layers being substantially orthogonal to each other, and the carbon fiber of said surface layers having tensile strength of 350 Kgf/mm² or more, and the carbon fiber of said intermediate layer having an elongation greater than that of the carbon fiber of said surface layers.

22. A plate member of a light-shielding blade, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers with tensile strength of 350 Kgf/mm² or more arranged in a first direction substantially parallel to the longitudinal direction of the light-shielding blade, and a matrix resin including this fiber, said intermediate layer means including at least one layer having staple carbon fibers arranged in a second direction substantially orthogonal to said first direction, the carbon fiber of said one layer of said intermediate layer means having an elongation greater than that of the carbon fiber of said one layer of each of said outer layer means.

23. A light-shielding plate member, having:

reinforced resin surface layers comprising continuous carbon fibers arranged in a first direction and a matrix resin including this fiber, and a reinforced resin intermediate layer comprising staple carbon fibers arranged in a second direction substantially orthogonal to said first direction, and a matrix resin including this fiber, the carbon fiber of said surface layers having tensile strength of 350 Kgf/mm$^2$ or more, and the carbon fiber of said intermediate layer having an elongation greater than that of the carbon fiber of said surface layers.

24. A light-shielding plate member, having:

a pair of reinforced resin outer layer means sandwiching a reinforced resin intermediate layer means, so as to provide a symmetric layer structure with respect to a central plane in the thickness direction of the sandwich, said pair of outer layer means each including at least one layer having continuous carbon fibers with tensile strength of 350 Kgf/mm$^2$ or more arranged in a first direction, and a matrix resin including this fiber, said intermediate layer means including at least one layer having staple carbon fibers arranged in a second direction substantially orthogonal to said first direction, the carbon fiber of said one layer of said intermediate layer means having an elongation greater than that of the carbon fiber of said one layer of each of said outer layer means.

* * * * *